United States Patent [19]
Honda et al.

[11] Patent Number: 5,875,079
[45] Date of Patent: Feb. 23, 1999

[54] THIN-FILM MAGNETIC HEAD WITH MR ELEMENT HARD AND SOFT MAGNETIC FILMS HAVING A WEAK EXCHANGE RECIPROCAL ACTION

[75] Inventors: Tadayuki Honda; Takuji Shibata; Akio Takada, all of Miyagi, Japan

[73] Assignee: Sony Corporation, Tokyo, Japan

[21] Appl. No.: 818,040

[22] Filed: Mar. 14, 1997

[30] Foreign Application Priority Data

Mar. 15, 1996 [JP] Japan ................................. 8-059617

[51] Int. Cl.⁶ ........................................................ G11B 5/39
[52] U.S. Cl. ........................................................ 360/113
[58] Field of Search ............................................... 360/113

[56] References Cited

U.S. PATENT DOCUMENTS

| | | | |
|---|---|---|---|
| 5,337,203 | 8/1994 | Kitada et al. | 360/113 |
| 5,434,826 | 7/1995 | Ravipati et al. | 360/113 X |
| 5,695,657 | 12/1997 | Shibata et al. | 360/113 X |
| 5,708,542 | 1/1998 | Takada et al. | 360/113 |

FOREIGN PATENT DOCUMENTS

| | | |
|---|---|---|
| A-2 0 529 959 | 3/1993 | European Pat. Off. . |
| A-2 0 613 148 | 8/1994 | European Pat. Off. . |
| A-2 0 677 750 | 10/1995 | European Pat. Off. . |

Primary Examiner—John H. Wolff
Attorney, Agent, or Firm—Hill & Simpson

[57] ABSTRACT

A thin-film magnetic head in which magnetic stability of a magnetoresistance effect film is improved for further stabilizing the playback output. The thin-film magnetic head includes a magnetoresistance effect stabilizing layer 11 having a hard magnetic member 11d and a soft magnetic member 11e, a non-magnetic insulating layer 12 layered on the magnetoresistance effect stabilizing layer 11, a magnetoresistance effect layer 13 layered on the non-magnetic insulating layer 12 and a pair of electrodes connected on both ends of the magnetoresistance effect layer 13. Under the effect of the hard magnetic member 11d, the magnetoresistance effect layer 13 is reduced in coercivity and, under the effect of the soft magnetic member 11e, the magnetic filed which proves to be the saturation flex density is increased.

14 Claims, 14 Drawing Sheets

THIN-FILM MAGNETIC HEAD WITH MR ELEMENT HARD AND SOFT MAGNETIC FILMS HAVING A WEAK EXCHANGE RECIPROCAL ACTION

BACKGROUND OF THE INVENTION

1. Field of the Invention

This invention relates to a magnetoresistance effect type thin-film magnetic head for detecting playback signals by the magnetoresistance effect, convenient for use in, for example, a hard disc device.

2. Description of the Related Art

In a magnetic recording device, such as a hard disc device, there is a demand for a higher recording density for increasing its recording capacity. For increasing the recording density, the recent tendency is to use a magnetoresistance effect type thin film magnetic head (æMR head") which is a magnetic head suited for reducing track width.

Basically, the MR head is made up of a magnetoresistance effect element 101 and electrodes mounted on both ends of the magnetoresistance effect element 101, as shown in FIG. 1. The magnetoresistance effect element 101 has a magnetoresistance effect film the specific resistance of which is changed depending on the intensity of the magnetic field. The sense current is supplied to this magnetoresistance effect element 101 from both electrodes 102 for detecting the changes in resistance in the magnetoresistance effect element 101 by the signal magnetic field from the magnetic recoding medium for obtaining the playback output based on the changes in resistance. The MR head has characteristics that the playback output is not dependent on the speed of the recording medium thus achieving high playback output despite low speed of the recording medium.

Usually, the magnetoresistance effect film is magnetically unstable such that the magnetic wall in the film is moved by the external magnetic field. Thus the MR head suffers from a problem that the Barkhausen noise is produced due to the movement of the magnetic wall of the magnetoresistance effect film in the magnetoresistance effect element. Thus it is crucial in the MR head to secure magnetic stability of the magnetoresistance effect film in the magnetoresistance effect element to reduce the Barkhausen noise.

For overcoming the above problem, there is proposed a magnetoresistance effect element having a magnetoresistance effect film stabilizing layer operating for increasing the magnetic stability of the magnetoresistance effect film. This magnetoresistance effect element has a magnetoresistance effect film having the magnetoresistance effect, a non-magnetic insulating film having this magnetoresistance effect film layered thereon, and a magnetoresistance effect film stabilizing layer having the non-magnetic insulating film layered thereon.

This magnetoresistance effect film stabilizing layer is made up of a hard magnetic film and a soft magnetic film layered together. This magnetoresistance effect film stabilizing layer is magnetically stabilized by the magnetized hard magnetic film producing a sole magnetic domain for the soft magnetic film. The magnetoresistance effect film stabilizing layer, thus magnetically stabilized, has been magnetically stabilized by providing a sole magnetic domain for the magnetoresistance effect film.

As described above, the conventional magnetoresistance effect film is provided with the magnetoresistance effect film stabilizing layer comprised of the hard magnetic film and the soft magnetic film layered together.

However, the soft magnetic film and the hard magnetic film need to be formed under strict control of the material type, film thickness and film-forming conditions. In particular, the soft magnetic film has been in need of strict control.

Thus, if it is not possible with the conventional magnetoresistance effect element to control the magnetic characteristics of the magnetic film, the magnetoresistance effect film cannot be formed into a sole magnetic domain, such that a magnetic wall is formed in the magnetoresistance effect film. Therefore, the conventional magnetoresistance effect element suffers from the problem that the Barkhausen noise is produced during playback due to this magnetic wall being moved discontinuously in the magnetoresistance effect film.

SUMMARY OF THE INVENTION

It is therefore an object of the present invention to provide a magnetoresistance effect type thin-film magnetic head employing a magnetoresistance effect film in which the magnetoresistance effect film is improved in magnetic stability for further stabilizing the playback output.

According to the present invention, there is provided a thin-film magnetic head including a magnetoresistance effect layer having a soft magnetic film exhibiting the magnetoresistance effect, a non-magnetic insulating layer and a magnetoresistance effect stabilizing layer formed on the magnetoresistance effect layer with the non-magnetic insulating layer in-between, wherein the magnetoresistance effect stabilizing layer has a hard magnetic layer and a soft magnetic layer. The rotation by spin of the hard magnetic film relative to the intensity of the external magnetic field is set so as to not occur simultaneously with that of the soft magnetic film relative to the intensity of the external magnetic field.

With the thin-film magnetic head according to the present invention, the hard magnetic film and the soft magnetic film are coupled to each other with a weak exchange reciprocal action for forming a magnetoresistance effect stabilizing layer in a magnetically stabilized state. Thus, with the thin-film magnetic head, the magnetoresistance effect stabilizing layer stabilizes the magnetoresistance effect layer for further stabilizing the playback output for improving the playback output.

BRIEF DESCRIPTION OF THE DRAWINGS

FIGS. 9 to 19 sequentially illustrate the process for producing the MR head shown in FIG. 2, in which FIG. 9 shows, in a schematic transverse cross-sectional view, the step for forming a lower gap layer.

FIG. 10 shows, in a schematic transverse cross-sectional view, the step for forming a thin film layer inclusive of a magnetoresistance effect film and a protective layer.

FIG. 11 shows, in a schematic cross-sectional perspective view, the step of forming a photoresist of a pre-set shape.

FIG. 12 shows, in a schematic cross-sectional perspective view, the state in which the protective layer and the magnetoresistance effect film have been etched.

FIG. 13 shows, in a schematic cross-sectional perspective view, the state of forming a non-magnetic insulating layer.

FIG. 14 shows, in a schematic cross-sectional perspective view, the state in which a photoresist and a non-magnetic insulating layer on the photoresist have been removed.

FIG. 15 shows, in a schematic cross-sectional perspective view, the state in which the photoresist and the non-magnetic insulating layer on the photoresist have been removed.

FIG. 16 shows, in a schematic cross-sectional perspective view, the step of forming a non-magnetic insulating layer and an aperture.

FIG. 17 shows, in a schematic cross-sectional perspective view, the step of forming a conductor layer for the sense current, a conductor layer for the bias current and a non-magnetic insulating layer.

FIG. 18 shows, in a schematic cross-sectional perspective view, the step of forming a lower gap layer and an upper gap layer.

FIG. 19 is a schematic front view showing the state in which the a non-magnetic insulating layer has been formed on the lower gap layer, the magnetoresistance effect element and the protective layer.

DESCRIPTION OF THE PREFERRED EMBODIMENTS

Figure 1:
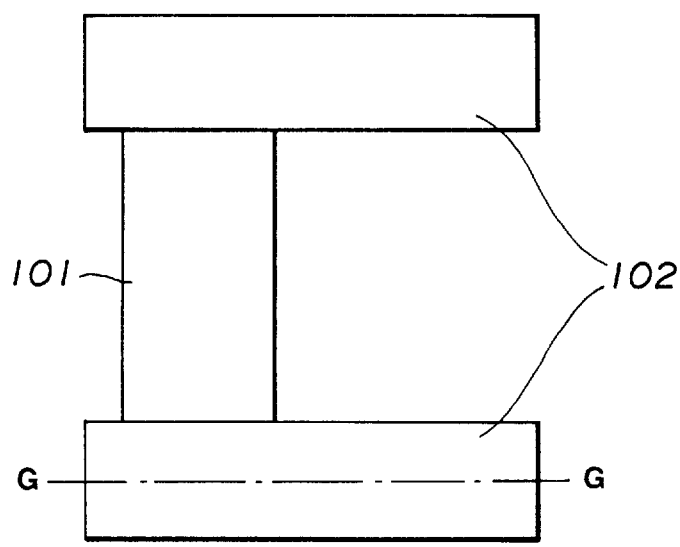
FIG. 1 is a schematic view showing a basic arrangement of an MR head.

Referring to the drawings, preferred embodiments of the present invention will be explained in detail. The present invention is not limited to the following embodiments and may be optionally modified as to the shape or the material type within the scope of the invention.

Figure 2:
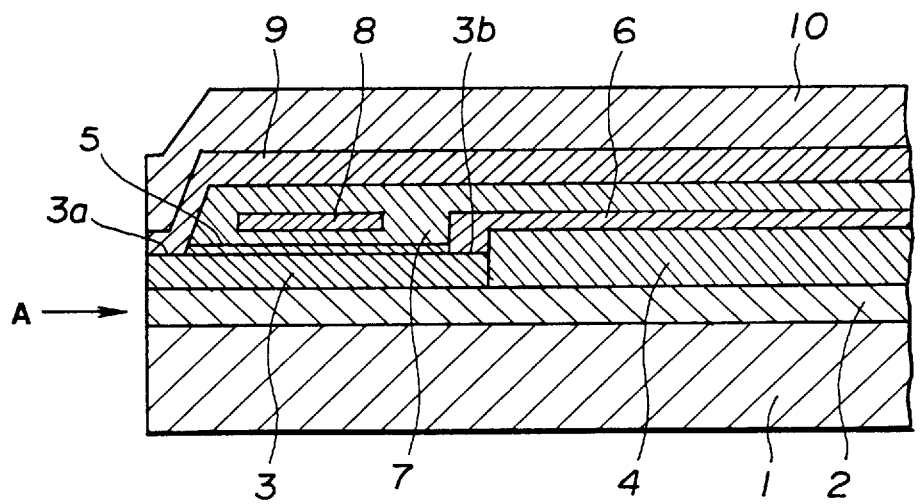
FIG. 2 is a schematic transverse cross-sectional view showing an embodiment of an MR head according to the present invention.

A thin-film magnetic head according to the present invention is an MR head having a magnetoresistance effect element having a magnetoresistance effect stabilizing layer. Referring to FIG. 2, the magnetic head includes a lower layer shield 1, a lower gap layer 2 formed on the lower shield layer 1 and a magnetoresistance effect element 3 and a non-magnetic insulating layer 4 both formed on the lower gap layer 2. The magnetic head also includes a protective layer 5 formed on the portions of the magnetoresistance effect element 3 other than a foremost portion 3a and a rearmost portion 3b of the magnetoresistance effect element 3 and a conductor layer 6 for the sense current formed for extending from the rearmost portion 3b of the magnetoresistance effect element 3 for overlying the non-magnetic insulating layer 4 for being connected to the magnetoresistance effect element 3 at the rearmost portion 3b. The magnetic head also includes a non-magnetic insulating layer 7 formed on the magnetoresistance effect element 3 and on the conductor layer for the sense current 6 and a conductor layer for the bias current 8 formed in the non-magnetic insulating layer 7 for overlying the magnetoresistance effect element 3. The magnetic head further includes an upper gap layer 9 formed for extending from the foremost part 3a of the magnetoresistance effect element 3 for overlying the non-magnetic insulating layer 7 for being connected to the magnetoresistance effect element 3 at the foremost portion 3a, and an upper layer shield 10 formed on the upper gap layer 9.

In the above MR head, the lower layer shield 1 and the upper layer shield 10 are formed of a magnetic material, while the lower gap layer 2 is formed of the non-magnetic insulating material and the upper gap layer 9 is formed of the non-magnetic electrically conductive material. The lower layer shield 1, upper layer shield 10, lower gap layer 2 and the upper gap layer 9 function for preventing the signal magnetic field from the magnetic recording medium other than that from an object to be reproduced from being introduced into the magnetoresistance effect element 3. That is, since the lower layer shield 1 and the upper layer shield 10 are arranged on the lower and upper sides of the magnetoresistance effect element 3 via lower gap layer 2 and via upper ga layer 9, respectively, the portion of the magnetic field from the magnetic recording medium other than that from the object to be reproduced is conducted to the lower layer shield 1 and the upper layer shield 10, while only the magnetic field from the object to be reproduced is introduced into the magnetoresistance effect element 3.

On the other hand, the conductor layer 6 and the upper ga layer 9 turn out to be a pair of electrodes connected to both ends of the magnetoresistance effect element 3, and function to supply the sense current to the magnetoresistance effect element 3. That is, the magnetoresistance effect element 3 is electrically connected to the conductor layer 6 for the sense current and to the upper gap layer 9 at the rear end 3b and at the foremost end 3a, respectively. For detecting the signal magnetic field from the magnetic recording medium, the sense current is supplied via these to the magnetoresistance effect element 3. The magnetoresistance effect element 3 is made up of a magnetoresistance effect stabilizing layer, a non-magnetic insulating layer and a magnetoresistance effect layer, layered together, as will be explained subsequently. The sense current is supplied only to the magnetoresistance effect layer.

The conductor layer for the bias current 8, formed in the non-magnetic insulating layer 7 for overlying the magnetoresistance effect element 3, functions to impress a bias magnetic field across the magnetoresistance effect element 3. That is, for detecting the signal magnetic field from the magnetic recording medium, the current is caused to flow in the conductor layer for the bias current 8 for applying the bias magnetic field across the magnetoresistance effect element 3 for obtaining higher magnetoresistance effect.

Figure 3:
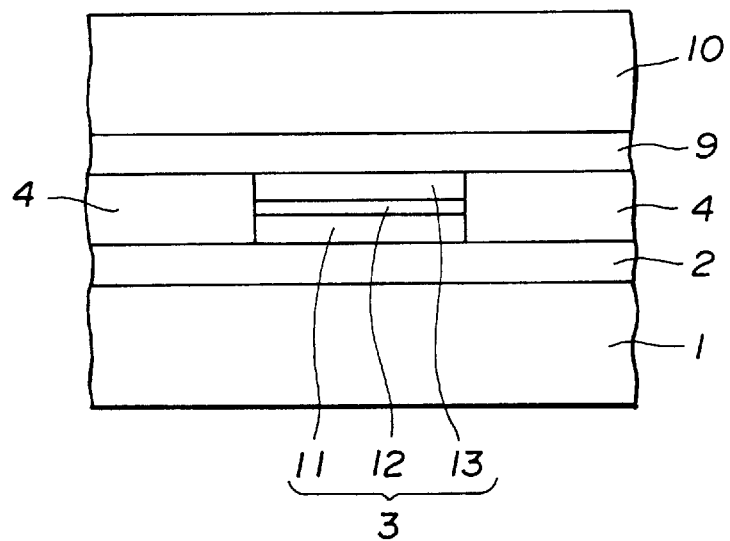
FIG. 3 is a schematic front view of the MR head shown in FIG. 2, looking from the surface thereof on which slides a magnetic recording medium.

FIG. 2 shows the MR head as viewed from the surface of the MR head along which is slid a magnetic recording medium, as indicated by arrow A in FIG. 2. Referring to FIG. 3, the magnetoresistance effect element 3 is made up of a magnetoresistance effect stabilizing layer 11, a non-magnetic insulating layer 12 and a magnetoresistance effect element 13, layered together, as shown in FIG. 3. The magnetoresistance effect element 13 is fed with the sense current for operating as a magnetically sensitive portion for detecting the signal from the recording medium, as described previously. On the other hand, the magnetoresistance effect stabilizing layer 11 is magnetostatically coupled to the magnetoresistance effect element 13 for contributing to improvement in magnetic stability of the magnetoresistance effect element 13.

On both sides of the magnetoresistance effect element 3 are arranged non-magnetic insulating layers 4 so that the magnetoresistance effect element is, as it were, buried in the non-magnetic insulating layers 4. The non-magnetic insulating layers 4, exposed to the surface of the MR head along which slides the magnetic recording medium, is preferably formed of a material having superior sliding characteristics, such as $Al_2O_3$, $SiO_2$, $SiN_x$, e.g., $Si_3N_4$.

On both ends of the upper surface of the magnetoresistance effect element 3, the magnetoresistance effect element 13 is connected to the electrodes. That is, as shown in FIGS. 2 and 3, the upper surface of the magnetoresistance effect element 13 is electrically connected to the upper gap layer 9 at the foremost part 3a the magnetoresistance effect element 3, whereas, as shown in FIG. 2, the upper surface of the magnetoresistance effect element 13 is electrically connected to the conductor layer for the sense current 6 at the rear end 3b of the magnetoresistance effect element 3. It should be noted that the magnetoresistance effect stabilizing layer 11 has its lateral sides and its upper side insulated by the non-magnetic insulating layers 4, 12, respectively, so the there is no risk of the sense current flowing therein.

With the MR head, employing the above-described magnetoresistance effect element 3, since the magnetostatic coupling action is produced between the magnetoresistance effect element 13 and the magnetoresistance effect stabilizing layer 11, the magnetoresistance effect element 13 is improved in magnetic stability, thereby reducing the Barkhausen noise.

Moreover, in the present MR head, the sense current is supplied only to the magnetoresistance effect layer 13, such that only the magnetoresistance effect element 13 operates as the magnetically sensitive portion. Therefore, in the present MR head, it is only the thickness of the magnetoresistance effect layer 13 that contributes to the playback output. Thus, with the present MR head, the thickness contributing to the payback output can be reduced to one-half that of the conventional two-layer MR head. By reducing the thickness of the magnetoresistance effect element 13 that contributes to the playback output, the current density of the sense current can be increased, thus assuring a high playback output in the present MR head.

The magnetoresistance effect element 3, employed in the above-described MR head, is now explained in detail.

The magnetoresistance effect element 3 is made up of the magnetoresistance effect stabilizing layer 11, non-magnetic insulating layer 12 and the magnetoresistance effect element 13, operating as a magnetically sensitive portion, layered together, as explained previously.

As for the non-magnetic insulating layer 12, provided between the magnetoresistance effect stabilizing layer 11 and the magnetoresistance effect layer 13, it suffices if it is formed of an electrically insulating non-magnetic material, such as $Al_2O_3$. For reducing the gap width, a thinner thickness of the non-magnetic insulating layer 12 is desirable. However, for maintaining insulation between the magnetoresistance effect stabilizing layer 11 and the magnetoresistance effect layer 13, a film thickness of approximately 10 nm or more is needed if use is made of $Al_2O_3$.

As for the magnetoresistance effect layer 13, it suffices if it includes a magnetoresistance effect film having the magnetoresistance effect. For example, it suffices if the layer 13 is formed only by the magnetoresistance effect film formed of, for example, NiFe, or if the layer 13 is formed by an underlying layer of Ta on which is formed a magnetoresistance effect film formed of, for example, NiFe.

If a magnetoresistance effect film, formed of, for example, NiFe, is formed on the underlying film, such as Ta film, the magnetoresistance effect film can be oriented in (111) for lowering the specific resistance of the magnetoresistance effect film. If the magnetoresistance effect film is lowered in specific resistance, the film is lowered in impedance. Therefore, the playback output of the MR head can be improved by providing the underlying layer.

The magnetoresistance effect stabilizing layer 11 is made up of an underlying film 11a, formed of, for example, Cr, a hard magnetic film 11b, formed thereon, and a soft magnetic film 11c formed on the hard magnetic film 11b. This magnetoresistance effect stabilizing layer 11 improves the magnetic stability of the magnetoresistance effect layer 13 by the magnetostatic coupling between the magnetoresistance effect stabilizing layer 11 and the magnetoresistance effect layer 13.

The underlying layer 11a is formed below the hard magnetic layer 11b which will be explained subsequently in detail for increasing the coercivity Hc of the hard magnetic layer 11b. The underlying layer 11a preferably has a film thickness of 10 nm.

Figure 4:
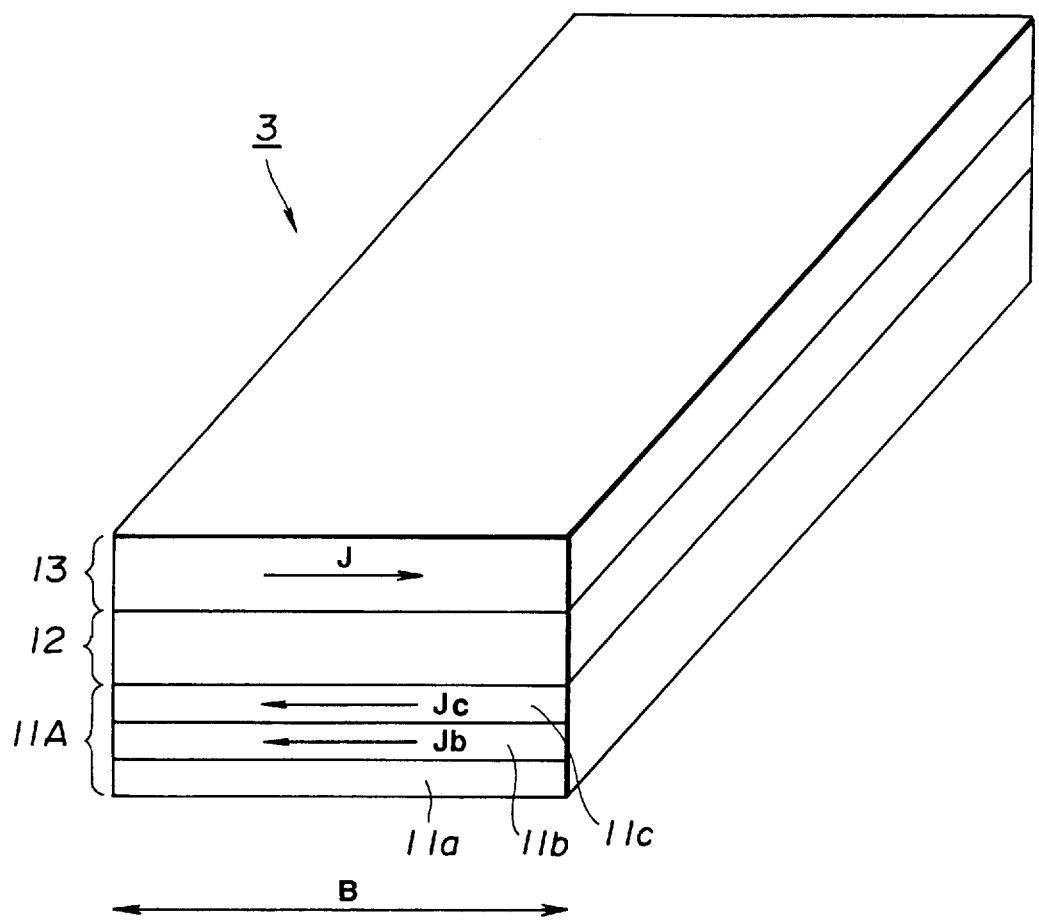
FIG. 4 is a perspective view showing an example of a magnetoresistance effect element employed in the MR head shown in FIG. 2.

The hard magnetic film 11b is formed of, for example, a hard magnetic material, such as CoPt, CoPtCr or CoNi, and is magnetized in a direction indicated by arrow Jb in FIG. 4. The hard magnetic film 11b is magnetized so that its direction of magnetization Jb will be parallel to the track width direction shown by arrow B in FIG. 4.

The soft magnetic film 11c s formed of a soft magnetic material, such as NiFe or NiFe-X, where X is Ta, Cr or Nb, and is magnetized in a direction indicated by arrow Jc in FIG. 4.

The magnetoresistance effect stabilizing layer 11 is a hard magnetic film 11b, magnetized so that its direction of magnetization Jb corresponds to the direction of track width, so that, if the stabilizing layer 11 is made up of the underlying layer 11a on which are layered the hard magnetic film 11b and the soft magnetic layer 11c, the magnetic field will be produced in the direction of track width B by the hard magnetic film 11b and the soft magnetic layer 11c. At this time, the direction of magnetization Jc of the soft magnetic film 11c corresponds to the direction of magnetization Jc of the soft magnetic layer 11c by the exchange coupling action. This soft magnetic film 11c operates for producing magnetostatic coupling between the magnetoresistance effect stabilizing layer 11 and the magnetoresistance effect layer 13. By this, the direction of magnetization J of the magnetoresistance effect layer 13 coincides with the track width direction B such that the magnetoresistance effect layer 13 becomes of the sole magnetic domain. The result is that the magnetoresistance effect layer 13 operates in stability without producing the noise due to movement of the magnetic wall.

In general, with the mono-layer soft magnetic film, it is difficult to orient the direction of magnetization completely to the inplane direction, even if the film is magnetized in the inplane direction, such that components of magnetization which are not oriented in the inplane direction are left. Consequently, the components perpendicular to the film surface are usually contained in the components of magnetization of the hard magnetic film 11b. These perpendicular components of magnetization represent a factor which detracts from magnetic stability of the magnetoresistance effect layer 13.

In the above-described magnetoresistance effect stabilizing layer 11, the soft magnetic film 11c is coupled to the hard magnetic film 11b by the exchange reciprocal action. The intensity of exchange reciprocal action can be set by varying the film forming conditions when forming and layering the soft magnetic film 11c on the hard magnetic film 11b.

Figure 5:
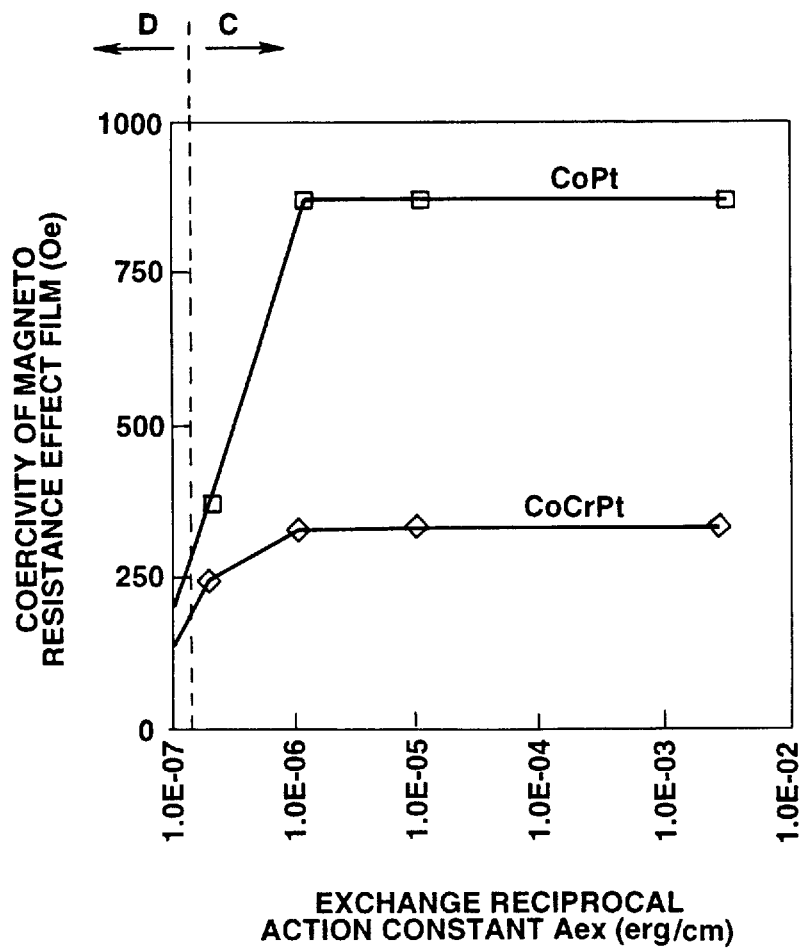
FIG. 5 is a curve showing the relation between the exchange reciprocal action constant in the exchange reciprocal action between the soft magnetic film and the hard magnetic film making up the magnetoresistance effect film shown in FIG. 4 and the coercivity of the soft magnetic film.

The magnetic characteristics of the magnetoresistance effect stabilizing layer 11 influence the stabilization of the magnetoresistance effect layer 13 depending on the intensity of the exchange reciprocal action. The magnetoresistance effect stabilizing layer 11 is formed so that the soft magnetic film 11c is coupled to the hard magnetic film 11b with a strong exchange reciprocal action by first surface-treating the surface of the hard magnetic film 11b formed on the underlying layer 11a by back-sputtering and subsequently forming the soft magnetic film 11c. The magnetoresistance effect stabilizing layer 11 is also formed so that the soft magnetic film 11c is coupled to the hard magnetic film 11b with a weak exchange reciprocal action by forming the soft magnetic film 11c without performing back-sputtering. In FIG. 5, the ordinate and the abscissa denote the reciprocal exchange action constant and the coercivity of the magnetoresistance effect stabilizing layer, respectively. The reciprocal exchange action constant is a constant specifying the intensity of the exchange reciprocal action between the hard magnetic film 11b and the soft magnetic film 11c. The larger the value of the constant, the stronger becomes the exchange reciprocal action with which the layers 11b, 11c are coupled together. In the following description, the coupling with the stronger exchange reciprocal action means the coupling with the exchange reciprocal action constant which is within the range denoted by arrow C in FIG. 5, while the coupling with the weaker exchange reciprocal action means the coupling with the exchange reciprocal action constant which is within the range denoted by arrow D in FIG. 5.

Figure 6:
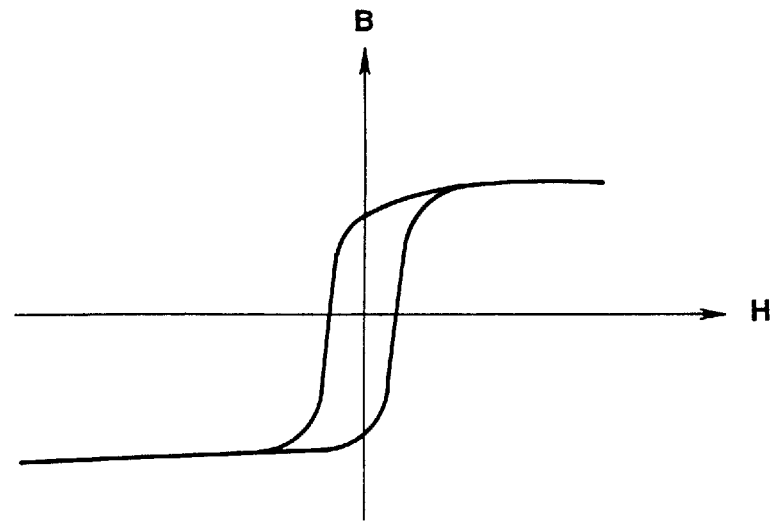
FIG. 6 is a curve showing a magnetization curve of a magnetoresistance effect stabilizing layer having a strong exchange reciprocal action shown in FIG. 5.

If the hard magnetic film 11b is coupled to the soft magnetic film 11c with a strong exchange reciprocal action, the magnetoresistance effect stabilizing layer 11 exhibits magnetization characteristics such that its magnetization curve is similar in shape to that of the usual hard magnetic material, as shown in FIG. 6.

These magnetization characteristics of the magnetoresistance effect stabilizing layer 11 are displayed by the fact that, due to the strong exchange reciprocal action with which the hard and soft magnetic films 11b, 11c are coupled together, the effect of the magnetization of the hard magnetic film 11b acts strongly on the soft magnetic film 11c. These characteristics of magnetization are ascribable to the fact that the spin rotation of the hard and soft magnetic films 11b, 11c occurs substantially simultaneously in the external magnetic field. At this time, the perpendicular components of magnetization of the hard magnetic film 11b produce similar perpendicular components on the soft magnetic film 11c thus adversely affecting the stability of the magnetoresistance effect layer 13.

Figure 7:
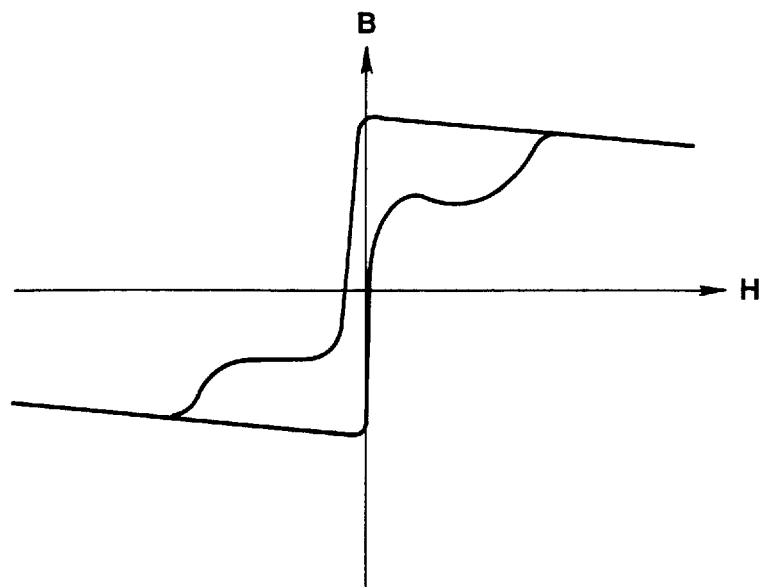
FIG. 7 is a curve showing a magnetization curve of a magnetoresistance effect stabilizing layer having a weak exchange reciprocal action shown in FIG. 5.

If the hard magnetic film 11b is coupled to the soft magnetic film 11c with a weak exchange reciprocal action, the magnetoresistance effect stabilizing layer 11 exhibits magnetization characteristics such that its magnetization curve is different in shape from that of the usual hard magnetic material, as shown in FIG. 7. The magnetization curve shown in FIG. 7 exhibits characteristics of magnetization of the soft magnetic film 11c for a weak external magnetic field, while exhibiting characteristics of magnetization of the soft magnetic film 11c for a weak external magnetic field. These characteristics of magnetization are caused by the fact that the magnetic characteristics of the hard magnetic film 11c are not operating strongly on the soft magnetic film 11c, while the spin rotation of the hard magnetic film 11b is not started simultaneously with that of the soft magnetic film 11c with respect to the external magnetic field. Specifically, should the magnetic field be applied from outside, the soft magnetic film 11c first starts to be rotated by spin. Then, if the magnetic field keeps on being applied, the hard magnetic film 11c starts to be rotated by spin. At this time, the perpendicular component of magnetization of the hard magnetic film 11b cannot produce similar perpendicular components to the soft magnetic film 11c so that there is no risk of any adverse effects on the stability of the magnetoresistance effect layer 13.

The underlying layer 11a, arranged below the hard magnetic layer 11b, is effective to improve coercivity of the hard magnetic layer 11b and to reduce the perpendicular components of magnetization of the hard magnetic film 11b. The result is that the underlying layer 11a contributes to magnetic stabilization of the magnetoresistance effect layer 13.

Figure 8:
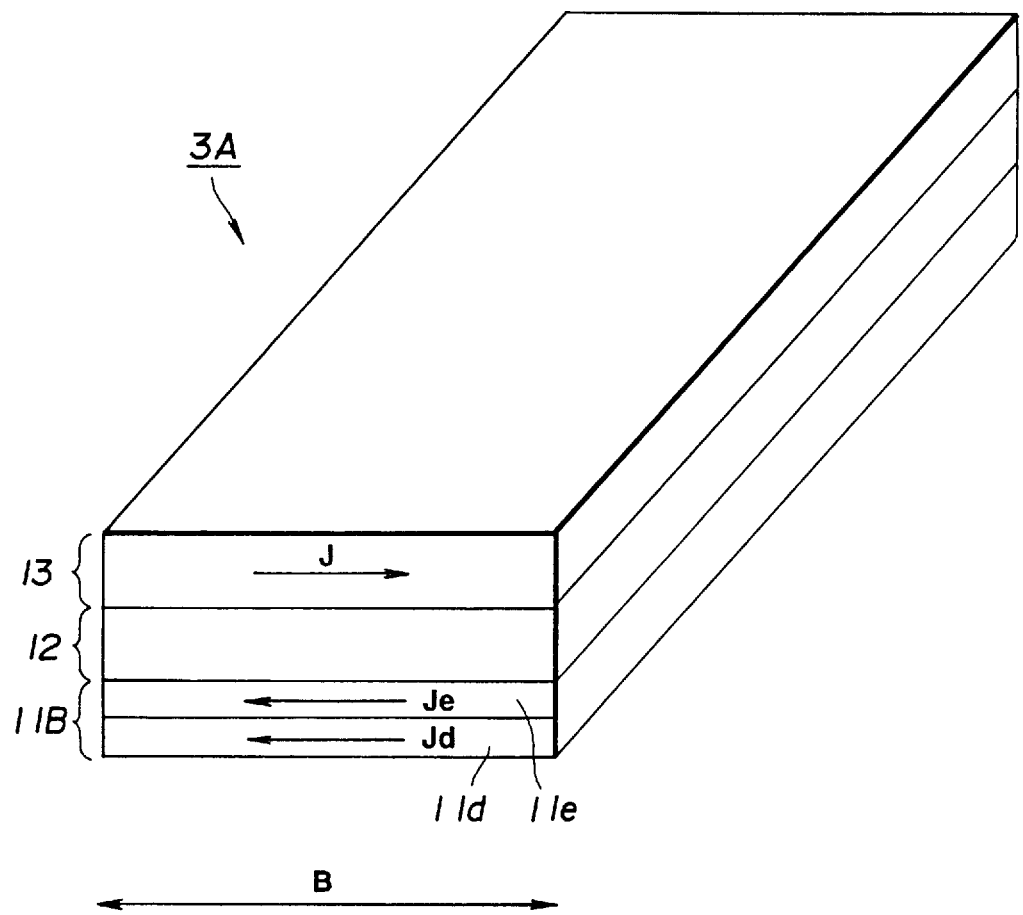
FIG. 8 is a perspective view showing another example of a magnetoresistance effect element employed in the MR head shown in FIG. 2.

The present invention is no limited to the above-described thin-film magnetic head and may also be applied to a thin film magnetic head having a magnetoresistance effect element 3A, as shown in FIG. 8.

The magnetoresistance effect element 3A may have a magnetoresistance effect stabilization layer 11B which is made up of a hard magnetic film 11d and a soft magnetic film lie formed on the hard magnetic film 11d. This magnetoresistance effect stabilization layer 11B operates in the same way as the above-described magnetoresistance effect stabilization layer 11 on the magnetoresistance effect layer 13 for improving magnetic stability of the magnetoresistance effect layer 13.

The hard magnetic film 11d is formed of hard magnetic materials, such as CoPt, CoPtCr or CoNi, and is magnetized in a direction indicated by arrow Jd in FIG. 8. The hard magnetic film 11d is magnetized so that its direction of magnetization Jd is parallel to the track width direction indicated by arrow B in FIG. 8.

The soft magnetic film 11e is formed of a soft magnetic material, such as NiFe or NiFe-X, where X is Ta, Cr or Nb, and is magnetized in a direction indicated by arrow Je in FIG. 8. The soft magnetic film 11e has its direction of magnetization Je set by being magnetized by the hard magnetic film 11d.

The method for producing the above-described MR head is hereinafter explained in detail.

Figure 9:
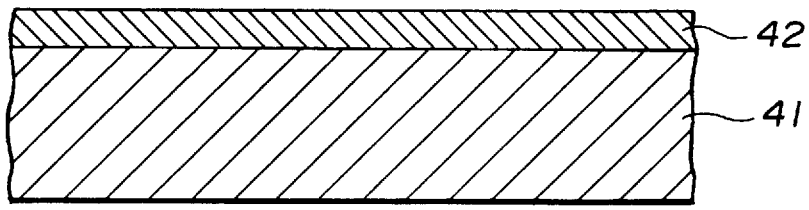

For producing the MR head, a lower gap layer 42 formed of a non-magnetic insulating material, such as $Al_2O_3$, is first formed on a lower layer shield 41, as shown in FIG. 9. The lower gap layer 42 serves for electrically insulating the lower portion of the magnetoresistance effect element formed in the subsequent step and for forming a magnetic gap on the lower portion of the magnetoresistance effect element.

Figure 10:
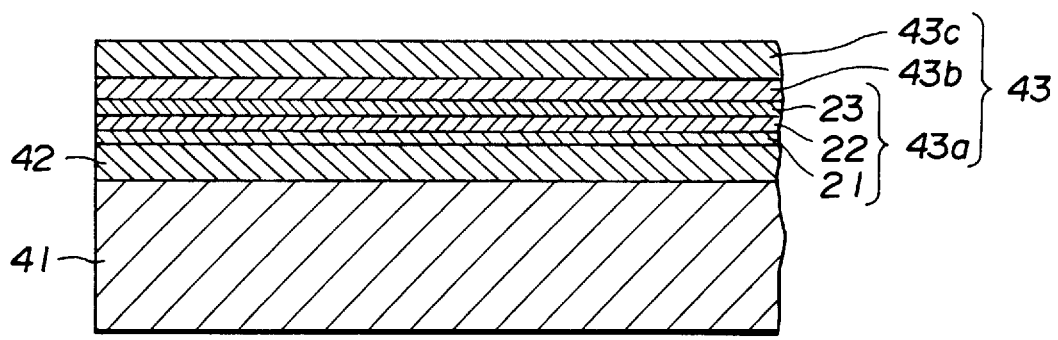

Then, as shown in FIG. 10, a thin film layer 43 inclusive of the magnetoresistance effect film is formed on the lower gap layer 42, and a protective layer 44 formed of, for example, Al₂O₃, is formed on the thin film layer 43. This thin film layer 43 is etched at a later step to form a magnetoresistance effect element, and is made up of a magnetoresistance effect stabilizing layer 43a, a non-magnetic insulating layer 43b of Al₂O₃, an underlying film of Ta and a magnetoresistance effect layer 43c formed by an NiFe film, layered together.

Referring to FIG. 10, the magnetoresistance effect stabilizing layer 43a is made up of an underlying film 21 of Cr, a hard magnetic film 22 of a hard magnetic material, such as CoPt, CoPtCr or CoNi, and a soft magnetic material 23 formed of a soft magnetic material, such as NiFe or NiFe-X, where X is Ta, Cr or Nb, layered on the lower gap layer 42.

This magnetoresistance effect stabilizing layer 43a is formed by forming the underlying layer 21 and the hard magnetic layer 22 on the lower ga layer 42 in the same film-forming tank and by subsequently forming the soft magnetic film 23.

When forming the soft magnetic film 23, the magnetoresistance effect stabilizing layer 43a is formed by not treating the surface of the hard magnetic film 22 with back-sputtering, with the hard magnetic film 22 and the soft magnetic film 23 thus being coupled to each other by weak exchange reciprocal action. If the soft magnetic film 23 is formed without back-sputtering the surface of the soft magnetic film 22, the magnetoresistance effect stabilizing layer 43a is formed under such a condition in which the hard magnetic film 22 is coupled to the soft magnetic film 23 with a weak exchange reciprocal action or with a strong reciprocal action if the film thickness of the hard magnetic film 22 is not more than 5 nm or more than 5 nm, respectively.

The thin film layer 43 is then formed by the non-magnetic insulating layer 43b being layered on the magnetoresistance effect layer 43c after formation of the magnetoresistance effect stabilization layer 43a as described above.

Therefore, the magnetoresistance effect stabilization layer 43a is formed under such a condition that the hard magnetic film 22 and the soft magnetic film 23 are coupled together by a weak exchange reciprocal action by the hard magnetic film 22 being formed to a film thickness of not more than 5 nm and by the soft magnetic film 23 being formed without surface treating the hard magnetic film 22 by, for example, back-sputtering. This assures stabilized magnetic characteristics of the magnetoresistance effect layer 43c.

Figure 11:
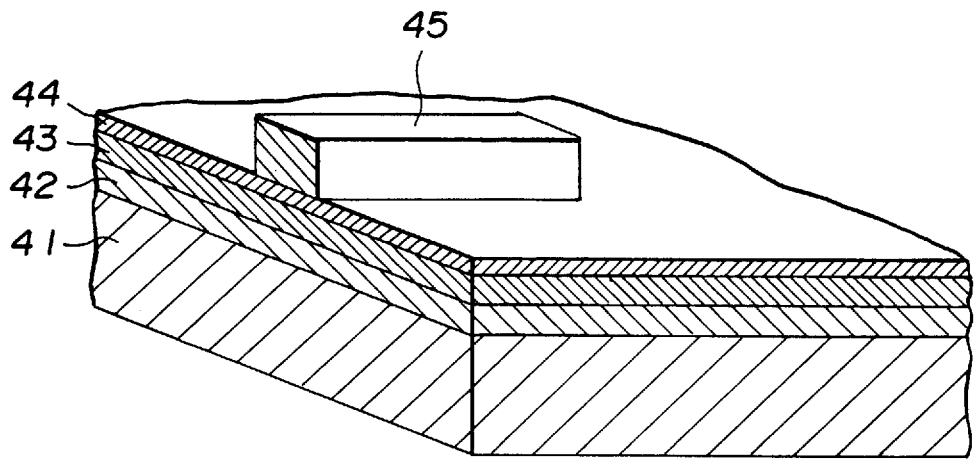
Figure 12:
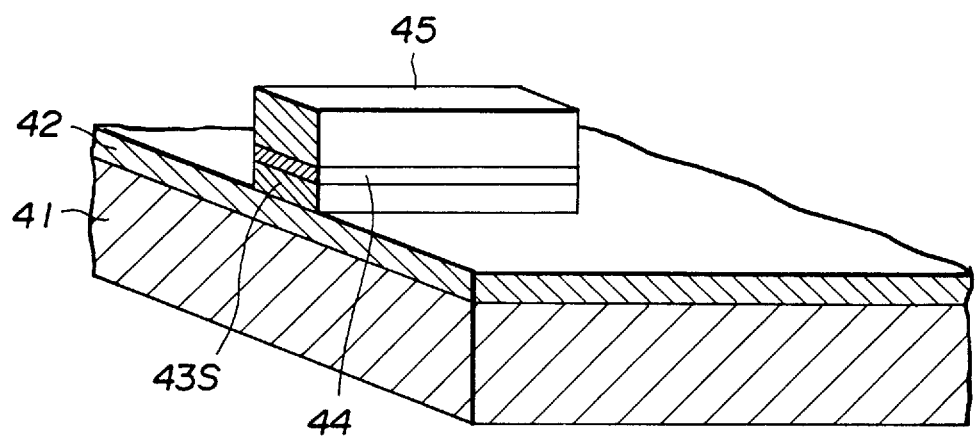

Then, for forming the thin film layer 43 to a magnetoresistance effect element of a pre-set shape, a photoresist 45, patterned to a pre-set shape, is formed on a protective layer 44, as shown in FIG. 11. The protective layer 44 and the thin film layer 43 are then etched, as shown in FIG. 12, for forming a magnetoresistance effect element of a pre-set shape 43S having the protective layer 44 formed thereon, as shown in FIG. 11.

By previously forming the thin film layer 43 including the magnetoresistance effect film and by subsequently etching the layer for forming the magnetoresistance effect element of a pre-set shape 43S, the magnetoresistance effect stabilizing layer 43a can be brought into registration with the magnetoresistance effect layer 43c. Thus, with such magnetoresistance effect element 43S, ideal magnetostatic coupling can be established between the magnetoresistance effect stabilizing layer 43a and the magnetoresistance effect layer 43b.

Figure 13:
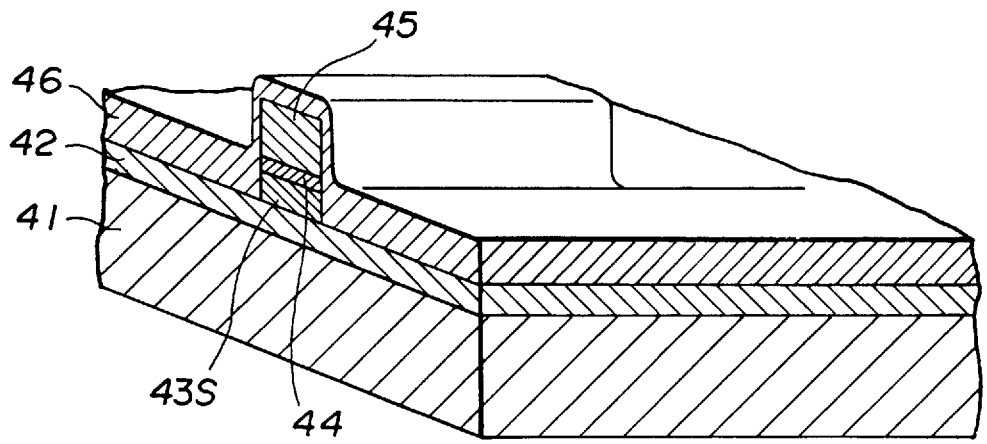

Then, as shown in FIG. 13, a non-magnetic insulating layer 46 is formed for overlying the photoresist 45, protective layer 44 and the magnetoresistance effect element 43S, with the photoresist left intact, and subsequently the photoresist 45 is peeled and removed along with the non-magnetic insulating layer 46 formed on the photoresist 45. After the photoresist 45 is peeled and removed along with the non-magnetic insulating layer 46 formed on the photoresist 45, the surfaces of the non-magnetic insulating layer 46 and the protective layer 44 are ground and planarized. This gives rise to the state in which the magnetoresistance effect element 43S and the protective layer 44 are embedded in the non-magnetic insulating layer 46.

By the so-called lift-off method in which the photoresist 45 is removed along with the non-magnetic insulating layer 46 formed thereon, the state in which the magnetoresistance effect element 43S and the protective layer 44 have been buried in the non-magnetic insulating layer 46 can be produced easily. However, wit such lift-off method, there arises a risk that burrs or the like tend to be formed at an edge on peeling off the photoresist thus lowering surface roughness to affect magnetic properties of the magnetoresistance effect element 43S or insulating properties or worsening the shape of the upper gap layer or the upper layer shield formed during the subsequent step. Therefore, after peeling off the photoresist 45, it is advisable to grind the surfaces of the non-magnetic insulating layer 46 or the protective layer 44 for improving surface properties.

For grinding the surfaces of the non-magnetic insulating layer 46 and the protective layer 44 after exfoliation of the photoresist 45, it is necessary to increase the film thickness of the protective layer 44 in consideration of the amount ground off in the main step. Specifically, should the protective layer 44 be of Al₂O₃, the ultimate film thickness of the order of 20 nm is optimum for the protective layer 44. On the other hand, in order to provide a sufficiently planar surface 44 by the grinding of the main step, the grinding on the order of 50 nm is required. Therefore, if , after exfoliation of the photoresist 45, the surfaces of the non-magnetic insulating layer 46 and the protective layer 44 are ground, it suffices if the protective layer 44 of, for example, Al₂O₃, is previously formed to a thickness on the order of 70 nm, and the film is planarized by grinding by approximately 50 nm in the main step for providing the ultimate film thickness of the protective layer 44 on the order of 20 nm.

By grinding the surfaces of the non-magnetic insulating layer 46 and the protective layer 44 in this manner, the magnetic characteristics of the magnetoresistance effect element 43S or the insulating properties are improved, while the shape of the upper layer shield formed in the subsequent process becomes ideal, thus improving the frequency response of the MR head.

Figure 16:
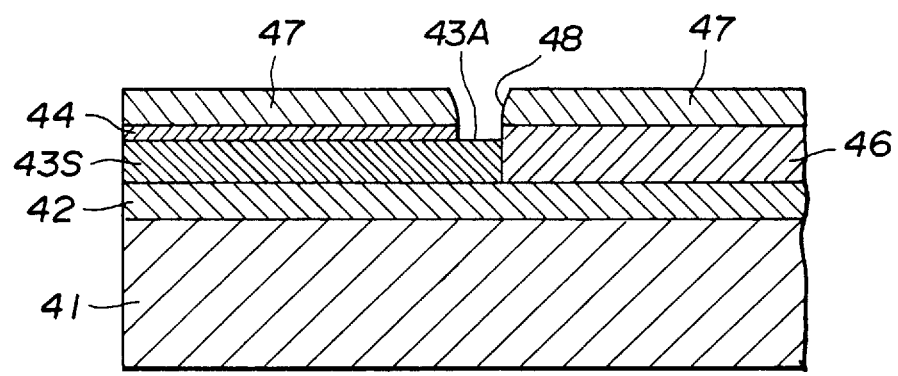

Then, after forming a new non-magnetic insulating layer 47 on the protective layer 44 and on the non-magnetic insulating layer 46, the non-magnetic insulating layer 47 and the protective layer 44 on the rear end 43A of the magnetoresistance effect element 43S are etched off for forming an opening 48 exposing the rear end 43A of the magnetoresistance effect element 43S, as shown in FIG. 16.

Figure 17:
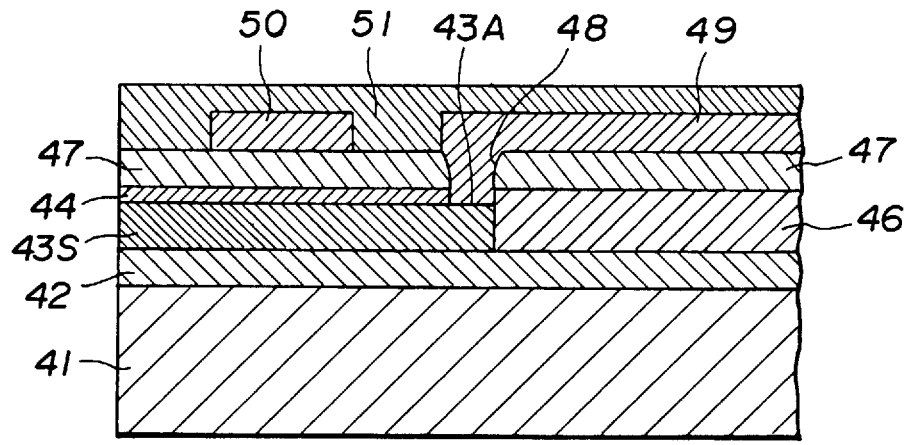

Then, on the rear end 43A of the magnetoresistance effect element 43S and on the non-magnetic insulating layer 47, a conductor layer for the sense current 49 is formed, via the opening 48 formed in the previous step, for connection to the upper surface of the magnetoresistance effect element 43S, while a conductor layer for the bias current 50 is formed on the non-magnetic insulating layer 47 for overlying the magnetoresistance effect element 43S, as shown in FIG. 17. On these layers 49, 50 is further formed a non-magnetic insulating layer 51, as shown in FIG. 17.

Figure 18:
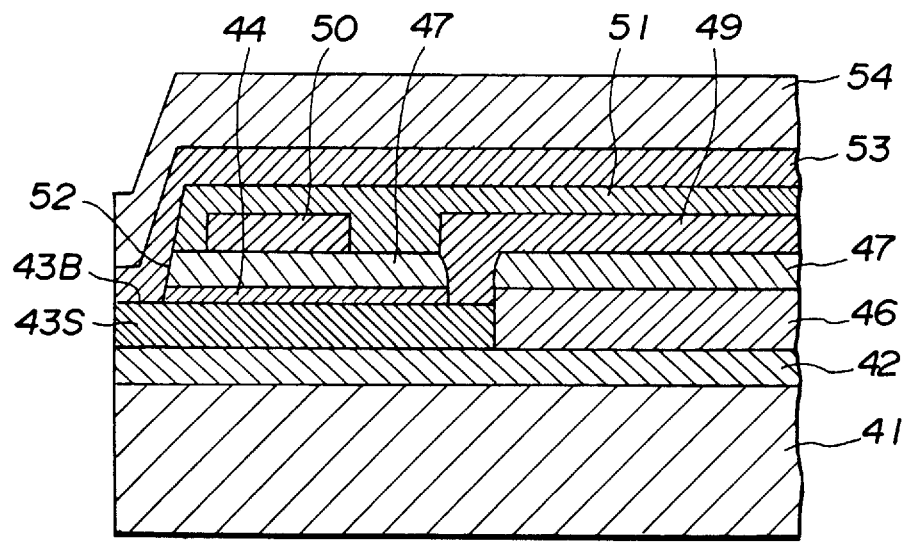

The non-magnetic insulating layer 51, non-magnetic insulating layer 47 and the protective layer 44 on the foremost part 43B of the magnetoresistance effect element 43S are then etched for forming an opening 52 exposing the foremost part 43B of the magnetoresistance effect element 43S, after which an upper gap layer 53 is formed via the opening 52 on the foremost part 43B of the magnetoresistance effect element 43S and on the non-magnetic insulating layer 51 into contact with the upper surface of the magnetoresistance effect element 43S, and further an upper layer shield 54 is formed thereon, as shown in FIG. 18.

An MR head is produced by slicing an assembly prepared by the above operations. Since the MR head, thus produced, is a read-only magnetic head, an inductive head for recording may further be layered on the MR head.

Figure 14:
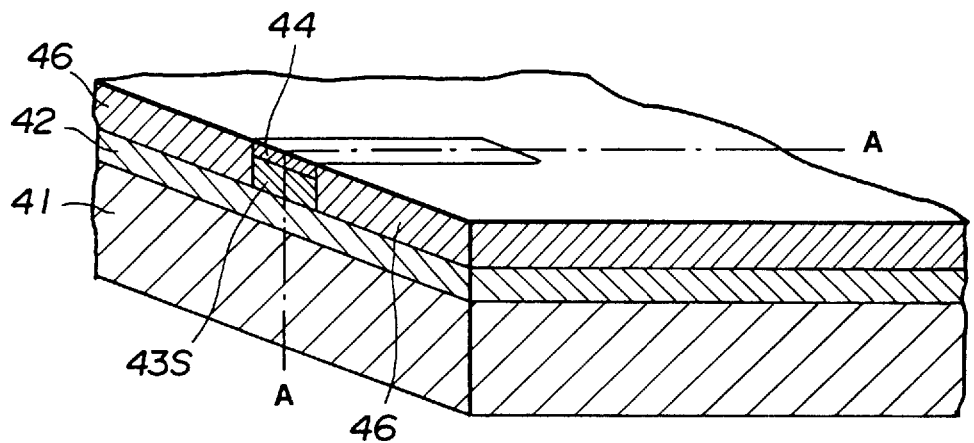
Figure 15:
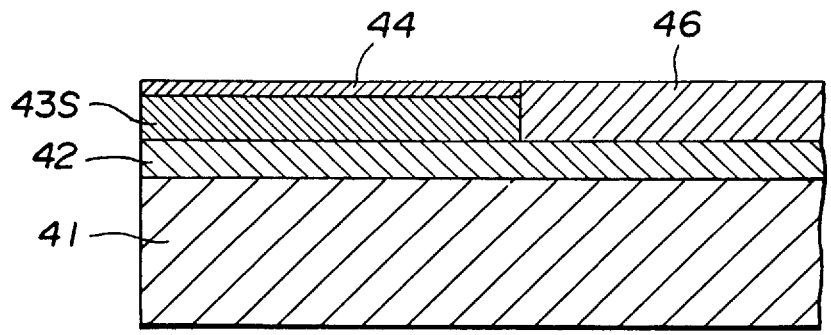

Meanwhile, in the above-described method for producing the MR head, the non-magnetic insulating layer 46 is formed while the photoresist 45 is left for realizing such a state in which the magnetoresistance effect element 43S and the protective layer 44 are buried in the non-magnetic insulating layer 46, and subsequently the photoresist 45 is removed along with the non-magnetic insulating layer 46 thereon, as shown in FIGS. 14 and 15. However, the state in which the magnetoresistance effect element 43S and the protective layer 44 are buried in the non-magnetic insulating layer 46 can be realized by techniques other than those described above.

Specifically, the state in which the magnetoresistance effect element 43S and the protective layer 44 are buried in the non-magnetic insulating layer 46 can be realized by forming a non-magnetic insulating layer on the lower gap layer 42, magnetoresistance effect element 43S and on the protective layer 44 and subsequently etching back the non-magnetic insulating layer.

Figure 19:
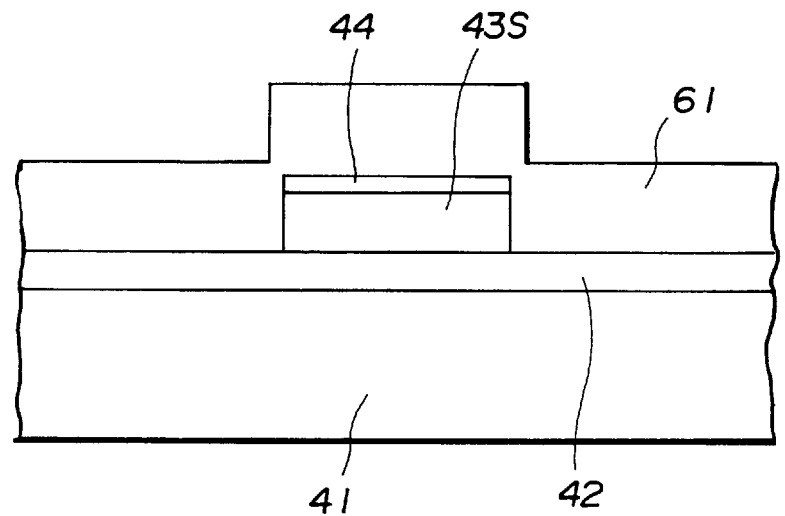
Figure 20:
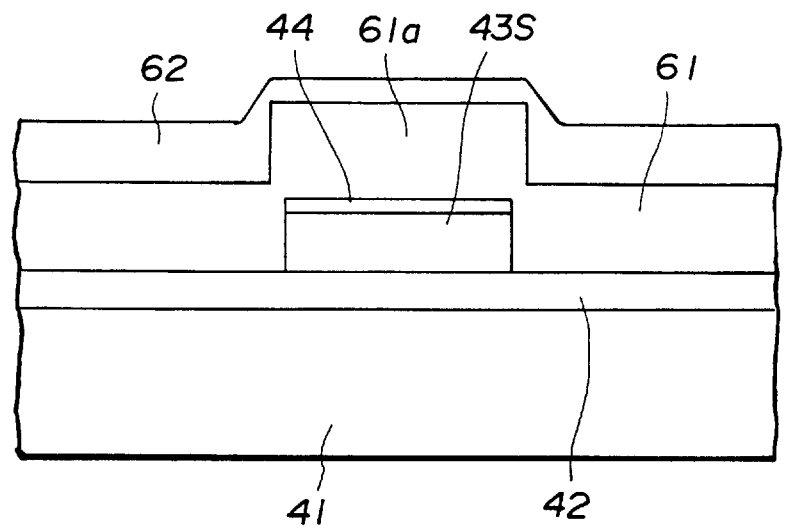
FIG. 20 is a schematic front view showing the step next to the step of FIG. 1, and specifically showing the state in which the photoresist has been formed on the non-magnetic insulating layer.

That is, after forming the magnetoresistance effect element 43S and the protective layer 44, as shown in FIG. 12, and removing the photoresist 45, a non-magnetic insulating layer 61 is formed for overlying the lower gap layer 42, magnetoresistance effect element 43S and the protective layer 44, as shown in FIG. 19 which is a view looking from the surface of the MR head along which slides the magnetic recording medium. Then, a photoresist 62 is formed on the non-magnetic insulating layer 61, as shown in FIG. 20. In an area of the non-magnetic insulating layer 61 other than that overlying the magnetoresistance effect element 43S, the photoresist 20 is applied to a thickness substantially equal to or slightly less than the film thickness of the magnetoresistance effect element 43S. In this manner, the film thickness of the photoresist 62 is thicker in the area of the non-magnetic insulating layer 61 other than that overlying the magnetoresistance effect element 43S, while becoming thinner in the area of the non-magnetic insulating layer 61 overlying the magnetoresistance effect element 43S.

After the entire surface is coated with the photoresist 62, the entire surface is etched back. At this time, the etching rate for the photoresist 61 and the non-magnetic insulating layer 61 is suitably selected for selectively etching a non-magnetic insulating layer area 61a lying on the magnetoresistance effect element 43S and the protective layer 44 for reducing the step difference and for providing a planarized upper surface.

The result is that the surface is substantially planarized, while the magnetoresistance effect element 43S and the protective layer 44 are buried in the non-magnetic insulating layer 61. The subsequent process is the same as that explained above for the MR head.

Figure 21:
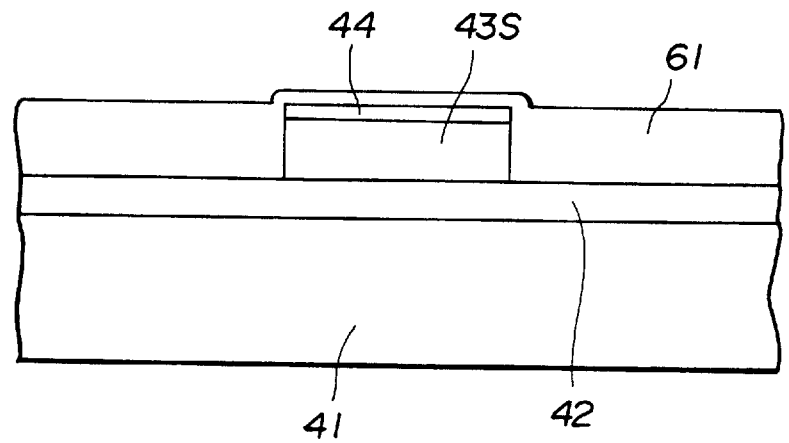
FIG. 21 is a schematic front view showing the step next to the step of FIG. 1, an specifically showing the state in which the surface has been planarized by etchback.

For etchback, it suffices if the surface is substantially planarized, while the non-magnetic insulating layer 61 may be left on the protective layer 44, as shown in FIG. 21. If the non-magnetic insulating layer 61 is left on the protective layer 44, as shown in FIG. 21, it suffices if, during formation of the opening 48 for connecting the conductor layer for the sense current 49 and the magnetoresistance effect element 43S to each other or the opening 52 for interconnecting the upper gap layer 53 and the magnetoresistance effect element 43S in a subsequent step, the portions of the non-magnetic insulating layer 61 in the openings 48, 52 are removed along with the protective layer 44 for forming the openings 48, 52.

Alternatively, the state in which the magnetoresistance effect element 43S and the protective layer 44 are buried in the non-magnetic insulating layer may also be realized by first forming the non-magnetic insulating layer on the lower gap layer 42, magnetoresistance effect element 43S and the protective layer 44, and subsequently grinding off the non-magnetic insulating layer.

Figure 22:
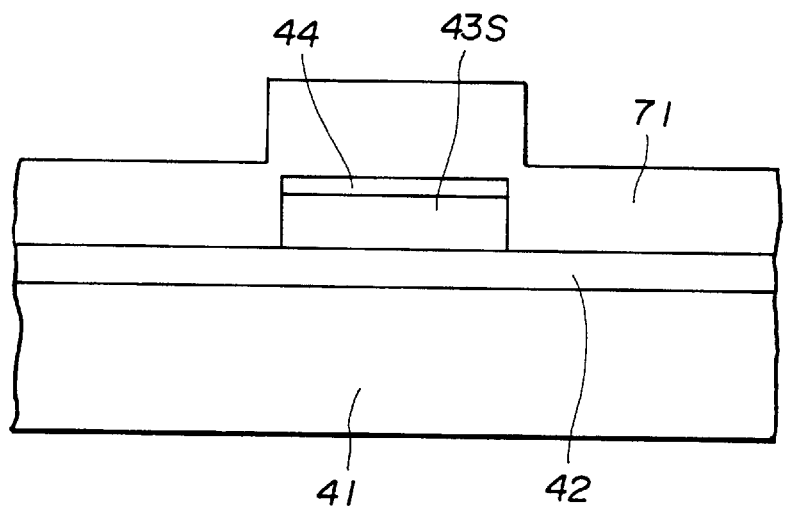
FIG. 22 is a schematic front view showing the state in which the a non-magnetic insulating layer has been formed on the lower gap layer, the magnetoresistance effect element and the protective layer.
Figure 23:
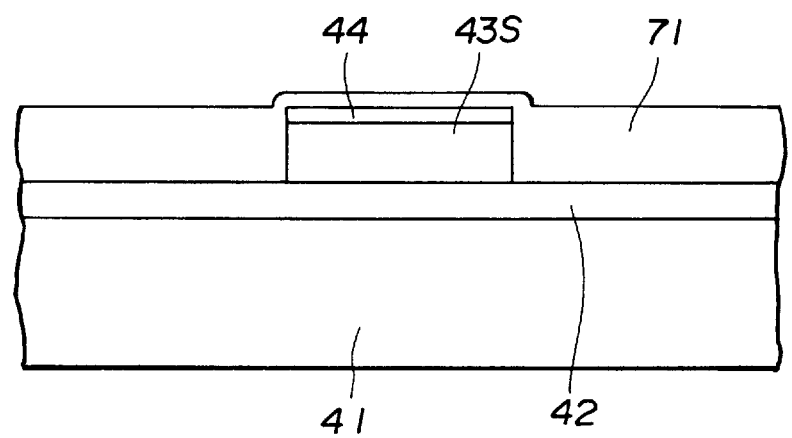
FIG. 23 is a schematic front view showing a step next to the step shown in FIG. 22, and specifically showing the state in which the surface has been planarized by surface grinding.

That is, after forming the magnetoresistance effect element 43S and the protective layer 44, as shown in FIG. 12, and removing the photoresist 45, a non-magnetic insulating layer 71 is formed for overlying the lower gap layer 42, magnetoresistance effect element 43S and the protective layer 44, as shown in FIG. 22 which is a view looking from the surface of the MR head along which slides the magnetic recording medium. The entire surface is then ground, as shown in FIG. 23, so that there is produced a planar surface free of surface step differences. The subsequent process steps are similar to those explained above for the MR head.

For grinding the non-magnetic insulating layer 71 in this manner, it suffices if the surface is substantially planarized, while the non-magnetic insulating layer 71 may be left on the protective layer 44, as shown in FIG. 23. If the non-magnetic insulating layer 71 is left on the protective layer 44, as shown in FIG. 23, it suffices if, during formation of the opening 48 for connecting the conductor layer for the sense current 49 and the magnetoresistance effect element 43S to each other or the opening 52 for interconnecting the upper gap layer 53 and the magnetoresistance effect element 43S in a subsequent step, the portions of the non-magnetic insulating layer 71 in the openings 48, 52 are removed along with the protective layer 44 for forming the openings 48, 52.

What is claimed is:

1. A thin-film magnetic head comprising:
    a magnetoresistance effect layer having a soft magnetic film exhibiting the magnetoresistance effect;
    a non-magnetic insulating layer; and
    a magnetoresistance effect stabilizing layer formed on said magnetoresistance effect layer with said non-magnetic insulating layer in-between, said magnetoresistance effect stabilizing layer comprising a hard magnetic film and a soft magnetic film; wherein
    the hard magnetic film and the soft magnetic film are coupled to each other with a weak exchange reciprocal action to place the magnetoresistance effect stabilizing layer in a magnetically stabilized state so that spin rotation of the hard magnetic film magnetic axes relative to the intensity of an external magnetic field does not occur simultaneously with spin rotation of the magnetic axes of the soft magnetic film relative to the intensity of the external magnetic field.

2. The thin-film magnetic head as claimed in claim 1 wherein the spin rotation of the magnetic axes of said soft magnetic film occurs first followed by the spin rotation of the magnetic axes of said hard magnetic film in response to an increasing external magnetic field.

3. The thin-film magnetic head as claimed in claim 1 wherein said magnetoresistance effect stabilizing layer has an underlying layer for said hard magnetic layer, said underlying layer increasing coercivity of said hard magnetic film.

4. The thin-film magnetic head as claimed in claim 3 wherein said underlying comprises Cr.

5. The thin-film magnetic head as claimed in claim 1 wherein said hard magnetic film comprises a Cr based hard magnetic material.

6. The thin-film magnetic head as claimed in claim 1 wherein said soft magnetic film comprises an NiFe based soft magnetic material.

7. The thin-film magnetic head as claimed in claim 1 wherein said hard magnetic film is not more than 5 μm in thickness and comprises a Co based hard magnetic material, and wherein said soft magnetic film comprises a NiFe based soft magnetic materials and is layered on said hard magnetic film.

8. The thin-film magnetic head as claimed in claim 1 wherein said hard magnetic film comprises CoPt.

9. The thin-film magnetic head as claimed in claim 1 wherein said hard magnetic film comprises CoPtCr.

10. The thin-film magnetic head as claimed in claim 1 wherein said hard magnetic film comprises CoNi.

11. The thin-film magnetic head as claimed in claim 1 wherein said soft magnetic film comprises NiFe.

12. The thin-film magnetic head as claimed in claim 1 wherein said soft magnetic film comprises NiFeTa.

13. The thin-film magnetic head as claimed in claim 1 wherein said soft magnetic film comprises NiFeCr.

14. The thin-film magnetic head as claimed in claim 1 wherein said soft magnetic film comprises NiFeNb.

* * * * *